United States Patent [19]
Kazami et al.

[11] Patent Number: 4,714,938
[45] Date of Patent: Dec. 22, 1987

[54] WARNING APPARATUS FOR CAMERA

[75] Inventors: Kazuyuki Kazami; Toshiyuki Nakamura, both of Tokyo; Hiroshi Wakabayashi, Yokohama, all of Japan

[73] Assignee: Nippon Kogaku K. K., Tokyo, Japan

[21] Appl. No.: 7,171

[22] Filed: Jan. 27, 1987

[30] Foreign Application Priority Data

Jan. 29, 1986 [JP] Japan .............................. 61-11351[U]
Mar. 31, 1986 [JP] Japan .............................. 61-47730[U]

[51] Int. Cl.$^4$ ............................................. G03B 1/12
[52] U.S. Cl. .................................... 354/173.1; 354/214
[58] Field of Search ....................... 354/173.1, 214, 215

[56] References Cited

U.S. PATENT DOCUMENTS

| | | | |
|---|---|---|---|
| 4,343,545 | 8/1982 | Onogi ................................ | 354/173.1 |
| 4,482,226 | 8/1984 | Tamamura ........................ | 354/173.1 |
| 4,561,741 | 12/1985 | Ishiyaka et al. .................. | 354/214 X |

*Primary Examiner*—Michael L. Gellner
*Attorney, Agent, or Firm*—Shapiro and Shapiro

[57] ABSTRACT

A camera capable of automatically rewinding a film into a cartridge comprises detection means for detecting completion of a film rewinding operation and producing a detection signal, warning means, responsive to the detection signal, for warning, and control means for controlling the warning means. The control means has timer means for measuring a predetermined period of time.

6 Claims, 8 Drawing Figures

WARNING APPARATUS FOR CAMERA

BACKGROUND OF THE INVENTION

1. Field of the Invention

The present invention relates to a warning apparatus for a camera, responsive to a film rewinding operation.

2. Related Background Art

There has been proposed a camera which automatically rewinds a film into a cartridge by means of a motor.

SUMMARY OF THE INVENTION

It is an object of the present invention to provide an apparatus which can reliably signal completion of rewinding to a user and can prevent unnecessary consumption of a battery.

DETAILED DESCRIPTION OF THE PREFERRED EMBODIMENTS

Figure 1:
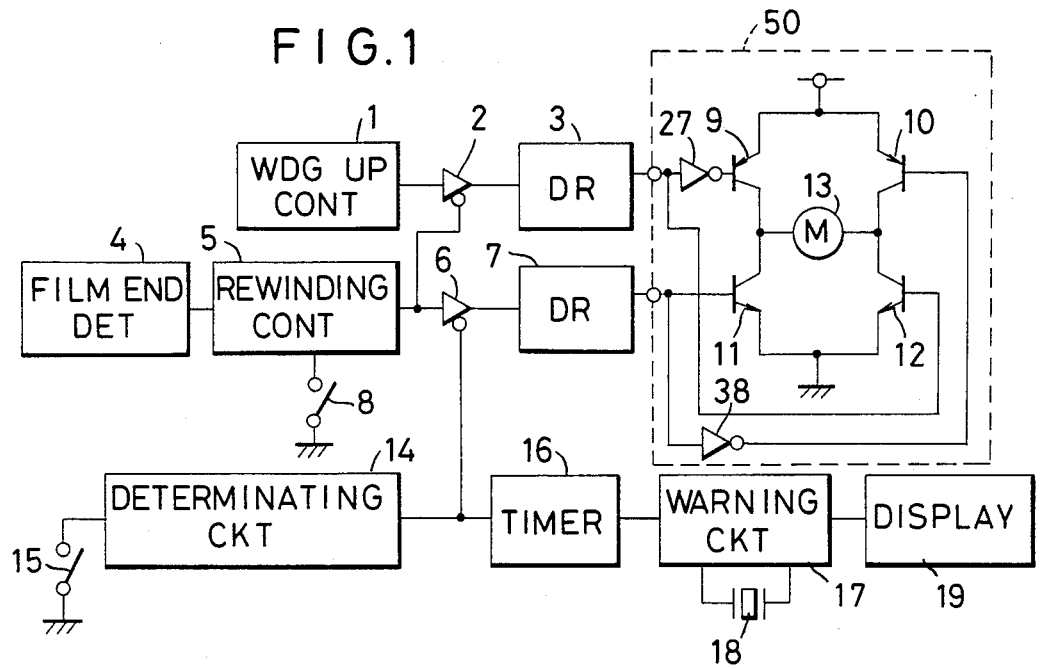
FIG. 1 is a block diagram showing a first embodiment of the present invention.

FIG. 1 is a block diagram showing the principle according to a first embodiment of the present invention. A motor 13 for feeding a film is connected to a bridge drive circuit constituted by transistors 9, 10, 11 and 12, and can be rotated in normal and reverse directions. A winding-up operation of a film from a cartridge is controlled by a winding-up control circuit 1. When an output from the circuit 1 goes to high level (to be referred to as Hi level hereinafter), the Hi-level signal is supplied to a normal-rotation driver 3 through a switch 2. The Hi-level signal sets the output from the circuit 3 at Hi level to turn on the transistor 12, and sets the output from an inverter 27 at low level (to be referred to as Lo level hereinafter) to turn on the transistor 9, thereby rotating the motor 7 in the normal direction. A rewinding operation of a film into a cartridge is determined by the state of a rewinding control circuit 5. The rewinding control circuit 5 is connected to an output terminal of a film end detecting circuit 4 and a rewinding setting switch 8. When a film end is detected by the detecting circuit 4 during the film winding-up operation, or when start of the rewinding operation is set upon operation of the switch 8, the output from the rewinding control circuit 5 goes to Hi level. The output from the rewinding control circuit 5 is supplied to a reverse-rotation driver 7 through a switch 6. In response to the Hi-level output from the circuit 5, the output from the driver 7 goes to Hi level so as to turn on the transistor 11, and the output from an inverter 38 goes to Lo level to turn on the transistor 10, thereby rotating the motor 13 in a reverse direction. Thus, the rewinding operation is performed. The rewinding operation is succeeded until a determinating circuit 14 determines completion of the rewinding operation, and outputs a Hi-level signal. The determining circuit 14 is connected to the output terminal of a film detecting switch 15. The film detecting switch 15 detects the absence of a film, thereby determining the completion of the rewinding operation. The film detecting switch 15 is responsive to a detector 90 for detecting whether or not a film is present in a path through which the film passes during the winding-up and rewinding operations. If the film is present in the path, the switch 15 is turned on; other wise, the switch 15 is turned off. Such a switch is known in, e.g., U.S. Pat. No. 4,482,226. When the completion of the rewinding operation is determined and the output from the determining circuit 14 goes to Hi level, the switch 6 is turned off, and the reverse-rotation driver 7 is disabled, so that the reverse rotation of the motor, i.e., the rewinding operation is stopped. As soon as the completion of the rewinding operation is determined, a timer 16 starts counting and generates a counting signal. While the timer 16 generates the signal, a warning circuit 17 is operated. The transistors 9 to 12, the motor 13, and the inverters 27 and 38 constitute a film driving unit 50. In this embodiment, a warning sound by means of a piezoelectric buzzer 18 and a visual display by means of display 19 are adopted as a warning means. In this invention, either of aural indication or visual display can be adopted.

Figure 2:
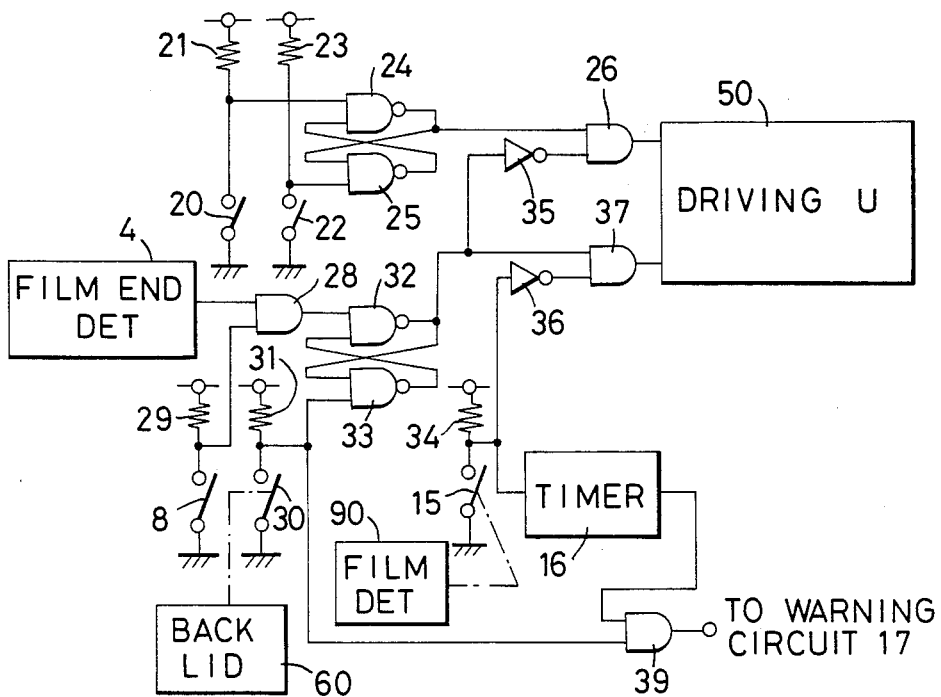
FIG. 2 is a block diagram showing a second embodiment of the present invention.

FIG. 2 shows a second embodiment of the present invention, and shows some detailed circuit arrangements in FIG. 1. The same reference numerals in FIG. 2 denote the same function blocks as in FIG. 1. A winding-up start switch 20 is connected to a resistor 21, and is connected to one input terminal of a NAND gate 24 which constitutes an R-S flip-flop. When the switch 20 is turned on, an output from the R-S flip-flop is inverted, and the output from the NAND gate 24 goes to Hi level. Instead of the winding-up start switch 20, a switch which electrically generates a Lo-level output can be used. The Hi-level output from the NAND gate 24 causes the transistor 12 to be turned on through an AND gate 26, and causes the transistor 9 to be turned on through the inverter 27. Thus, a motor 13 is rotated in a normal direction, thereby performing a film winding-up operation. The winding-up operation is completed by turning on a winding-up completion switch 22 as follows. An input terminal of a NAND gate 25 which is fixed at Hi level by a resistor 23 goes to Lo level to invert the output from the R-S flip-flop, so that the output from the R-S flip-flop goes to Lo level. Note that the winding-up completion switch 22 need not be a mechanical switch.

The switches 20 and 22, the resistors 21 and 23, and the NAND gates 24 and 25 correspond to the winding-up control circuit 1 in FIG. 1. As for the rewinding operation, the rewinding control circuit 5 in FIG. 1 corresponds to an R-S flip-flop constituted by NAND gates 32 and 33. An AND gate 28 is connected to one input terminal of the NAND gate 32. The input terminals of the AND gate 28 are connected to the film end detecting circuit 4, and the rewinding setting switch 8, which is connected to a resistor 29. When the film end detecting circuit 4 detects the film end during the winding-up operation and generates a Lo-level output, or when the rewinding setting switch 8 is turned on, the output from the AND gate 28 goes to Lo level, and the output from the NAND gate 32 goes to Hi level. When the output from the NAND gate 32 goes to Hi level, a Lo-level signal is supplied to one input terminal of the AND gate 26 through an inverter 35, thus disabling the AND gate 26. More specifically, the AND gate 26 corresponds to the switch 2 shown in FIG. 1, and stops the normal rotation. The Hi-level output from the NAND gate 32 turns on the transistor 11 through an AND gate 37, and turns on the transistor 10 through an inverter 38, thereby rotating the motor 13 in the reverse direction. When the rewinding operation goes on and the distal end of the film is released from the film detecting switch 15 to turn it off, the input to an inverter 36 which is fixed at Lo level by a resistor 34 goes to Hi level and the output from the AND gate 37 goes to Lo level. Therefore, the reverse rotation is stopped. At the same time, the timer 16 begins to operate upon turning off of the switch 15, and starts the warning operation as shown in FIG. 1. The output from the timer 16 is connected to an AND gate 39. The other input of the AND gate 39 is connected to a switch 30 which is cooperated with the opening/closing operation of a back lid 60 to be turned on/off. In this embodiment, the switch 30 is turned on when the back lid 60 is opened. When one input of the AND gate 39 which is fixed at Hi level by a resistor 31 goes to Lo level upon opening of the back lid 60, the output from the AND gate 39 goes to Lo level, and the warning operation is inhibited. More specifically, even when the timer 16 is operating, if the back lid 60 is opened, the warning operation is stopped at that time. In this embodiment, a gate means for shutting off the output from the timer 16 in response to a signal which is produced upon opening of the back lid 60 is arranged. For example, the timer 16 itself can be reset when the back lid 60 is opened.

In this embodiment, the switch which is cooperated with the opening/closing operation of the back lid is arranged. However, the present invention is not limited to this. For example, a switch which is cooperated with an unloading operation of a film cartridge to be turned on/off can be arranged.

The switch 30 is also connected to the input terminal of the NAND gate 33, so that the opening operation of the back lid cancels the rewinding operation.

Figure 3A:
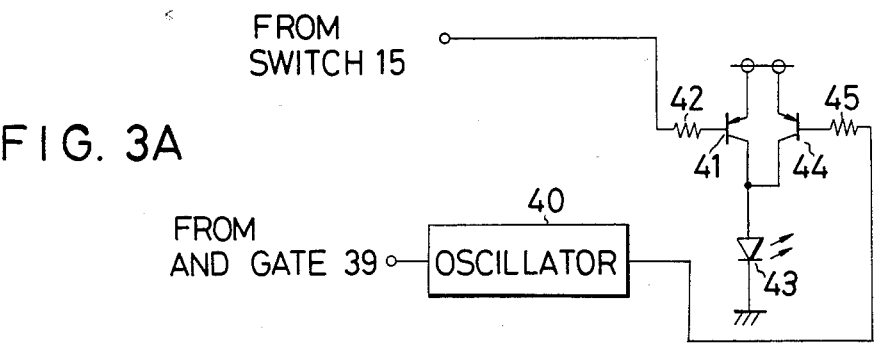
FIG. 3A is a block diagram showing an embodiment of a warning means of the present invention.

FIG. 3A shows the warning means of the present invention in detail. The output from the timer 16 which starts operating upon turning off of the switch 15 and the output from the switch 30 which is turned on upon opening of the back lid are connected to the input terminals of the AND gate 39. The output from the AND gate 39 is connected to an oscillator 40. The oscillator 40 is operated while the output from the AND gate 39 is at Hi level. The switch 15 is connected to a transistor 41 through a resistor 42. In a state wherein the film is loaded, since the switch 15 is kept on, the transistor 41 is turned on, and a film-present indicator 43 is turned on. When the rewinding operation is completed and the switch 15 is turned off, the transistor 41 is turned off. However, since the oscillator 40 starts operating, a transistor 44 is repetitively turned on and off thorugh a resistor 45, and the indicator 43 flickers. In this embodiment, an LED is used as the indicator but a liquid-crystal display and the like can also be used.

Figure 3B:
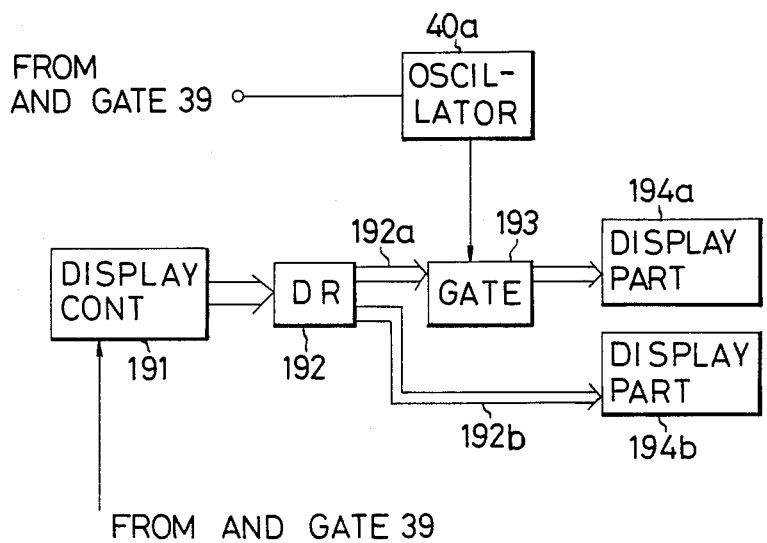
FIG. 3B is a block diagram showing another embodiment of the warning apparatus of the present invention.

FIG. 3B shows another embodiment of the warning means of the present invention. A display controller 191 outputs a signal corresponding to imaging information of a camera to a driver 192 for driving display patrs 194a and 194b. The imaging information includes a sensitivity of a film loaded in a camera, the number of frames of the film, and a charging degree of a battery. The driver 192 outputs a signal 192a corresponding to the number of frames of the film to the display part 194a through a gate circuit 193 in response to a signal from the display controller 191, and outputs a signal 192b associated with information other than the number of frames of the film to the display part 194b. The display parts 194a and 194b respectively comprise liquid-crystal display devices. An oscillator 40a generates a signal which alternately changes to Hi and Lo levels in a predetermined cycle while the AND gate 39 produces the Hi-level output. The oscillator 40a generates a Lo-level output while the AND gate 39 produces the Lo-level output. The gate circuit 193 transmits the signal 192a to the display part 194a while the output from the oscillator 40a is at Lo level. Therefore, with the arrangement shown in FIG. 3B, the liquid-crystal display device 194a which displays the number of frames of the film in response to completion of the rewinding operation of the film is intermittently driven to flicker. The display controller 191 stops generation of the imaging information signal in response to the trailing edge of the output from Hi to Lo from the AND gate 39, thereby stopping the display operation of the display parts 194a and 194b.

Figure 4:
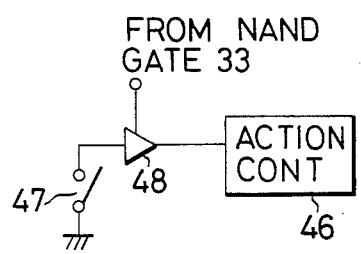
FIG. 4 is a block diagram showing an embodiment of an inhibiting means of the present invention.

FIG. 4 shows an action inhibiting mechanism used upon completion of the rewinding operation, which is added to the second embodiment of the present invention shown in FIG. 2. An action controlling circuit 46 controls normal imaging operations of a camera, for example, a photometric operation, release, focusing function, and the like. A switch 47 is cooperated with a release button. When the switch 47 is turned on, a release signal for starting a series of operations of a camera is generated. In this embodiment, a switch 48 is interposed between the switch 47 and the action controlling circuit 46. More specifically, the switch 48 is controlled by the output from the NAND gate 33. The switch 48 is disabled during the rewinding operation and during an interval from the completion of the rewinding operation until the back lid is opened. As a result, the release signal for starting the normal operations of the camera is inhibited from being transmitted to the action controlling circuit 46. Therefore, after the warning output is ended in a time determined by the timer 16, a user can be prevented from erroneous operations.

Note that if the switch 48 is controlled not by the output from the NAND gate 33 but by the output from the AND gate 39, the action inhibiting state can be set only while the warning output is generated.

Figure 5:
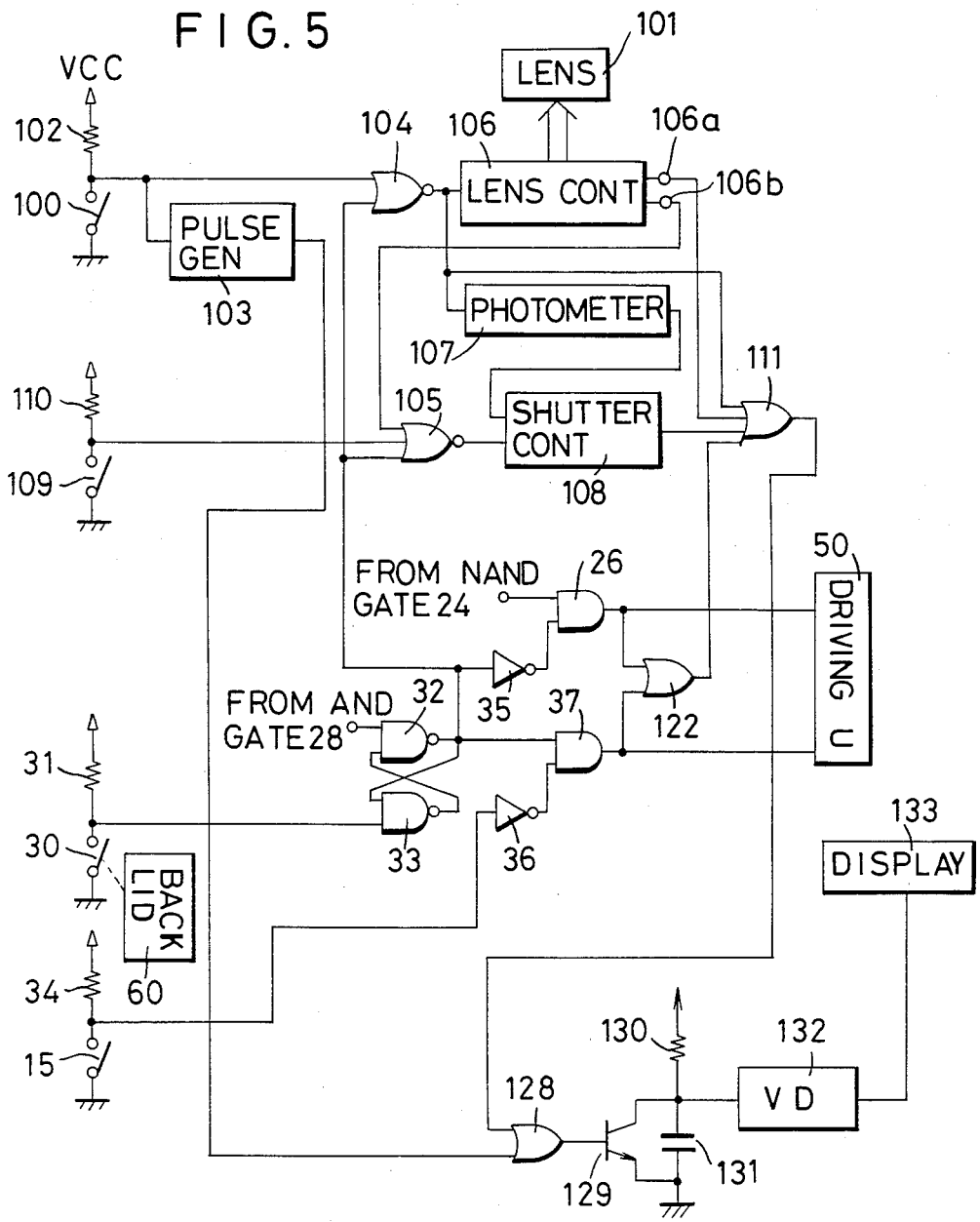
FIG. 5 is a block diagram showing a third embodiment of the present invention.

FIG. 5 is a block diagram showing a third embodiment of the present invention.

When a half-depression switch 100 is turned on by the first stroke of a release button, a photometer 107 and a lens control circuit 106 are enabled. In an automatic focusing method of a camera, a distance measurement operation is performed while a lens 101 is displaced from a predetermined reset position toward an object. When an in-focus position is detected, a motor for displacing the lens 101 is disabled to stop the lens 101, thereby performing the focusing operation The lens 101 begins to displace upon turning on of the half-depression switch 100. When the just-focus position is detected, the lens control circuit 106 shuts off power supply to the lens driving motor, and the lens 101 is stopped. Thereafter, when the release button is further depressed to a second stroke, a shutter control circuit 108 opens and closes a shutter in accordance with the output from the photometer 107 which is already operating.

After the shutter is closed, the lens control circuit 108 causes the lens to return to the predetermined reset position. Thereafter, a driving unit 50 winds up a film by one frame.

A normal imaging operation is performed in this manner. A display means is in a display enable state from when the half-depression switch is turned on until a predetermined time has passed after the completion of the film winding-up operation.

When the film end is reached during the winding-up operation, the driving unit 50 interrupts the winding-up operation, and starts the rewinding operation. During an interval from the completion of the rewinding operation until the back lid is opened, the displacement of the lens, the photometric operation, and the opening/closing operation of the shutter are inhibited even if the half-depression switch 100 and the release switch 109 are turned on (this state will be referred to as a "release lock" state hereinafter).

The display means continuously performed a display operation during the rewinding operation, and after the completion of the rewinding operation, does so for a predetermined period of time. Thereafter, the display means is turned off. If the half-depression switch is turned on after the display means is turned off, the camera is set in the release lock state, and no operation can start. In this state, the display means performs a display operation for a predetermined period of time.

Information that is associated with a camera and displayed by the display means includes the number of imaged frames of a film, the presence/absence of a film, a detection result of a charging state of a battery, an ISO value of a film, an operating state of an electronic flash, a shutter speed, an F number, and the like. Of course, other information can be displayed on the display means. The display can be made within a viewfinder or on a body surface of a camera.

As shown in FIG. 5, the half-depression switch is connected to a pull-up resistor 102. The half-depression switch 100 is also connected to one input terminal of a NOR gate 104 and a pulse generator 103. The pulse generator 103 generates a Hi-level signal when the switch 100 is turned on.

The other input terminal of the NOR gate 104 is connected to the output terminal of a NAND gate 104. The output terminal of the NOR gate 104 is connected to the lens control circuit 106 and the photometer 107.

The lens control circuit 106 positively energizes the lens driving motor when the output from the NOR gate 104 goes from Lo level to Hi level, thereby starting the lens displacement.

The lens control circuit 106 negatively energizes the lens driving motor when the output from the NOR gate 104 goes from Hi level to Lo level, thereby starting the returning operation of the lens. Thus, the lens is returned to the predetermined reset position.

An output terminal 106a of the lens control circuit 106 holds a Hi-level output during the displacement of the lens, and an output terminal 106b holds a Lo-level output from when the in-focus position is detected and the lens is stopped at that position until the lens is returned to the reset position and stopped.

The photometer 107 performs a photometric operation during the Hi-level output interval of the NOR gate 104. The measured value is continuously input to the shutter control circuit 108 during the photometric operation.

The release switch 109 is connected to a pull-up resistor 110, and to an input terminal of a NOR gate 105.

Input terminals of the NOR gate 105 are also connected to the output terminal 106b of the lens control circuit 106 and the output terminal of a NAND gate 117. The output terminal of the NOR gate 105 is connected to the input terminal of the shutter control circuit 108.

The shutter control circuit 108 starts operation when the output from the NOR gate 105 rises, and opens and closes the shutter in accordance with the measured value from the photometer 107. The circuit 108 sets its output at Hi level in response to the shutter opening operation, and sets it at Lo level in response to the shutter closing operation. The output terminal of the shutter control circuit 108 is connected to an OR gate 111.

The other input terminal of the AND gate 26 is connected to the output terminal of the NAND gate 32 through the inverter 35. The output terminal of the AND gate 26 is connected to the driving unit 50 and one input terminal of an OR gate 122. The other input terminal of the OR gate 122 is connected to the output terminal of the AND gate 37. The output terminal of the OR gate 122 is connected to the input terminal of the OR gate 111.

The output terminal of the NAND gate 32 is connected to the input terminals of the NOR gates 104 and 105.

The output terminal of the AND gate 37 is connected to the OR gate 122.

An input terminal of an OR gate 128 is connected to the output terminal of the OR gate 111 and the output terminal of the pulse generator 103. The output terminal of the OR gate 128 is connected to the base of an NPN transistor 129. The collector of the NPN transistor 129 is connected to the input terminal of a voltage detector 132, and the emitter thereof is grounded.

A resistor 130 is connected between the collector of the NPN transistor 129 and a power source (VCC), and a capacitor 131 is connected between the collector of the NPN transistor 129 and the ground potential.

The voltage detector 132 generates a Hi-level output when the voltage charged in the capacitor 131 exceeds a predetermined threshold value, and otherwise generates a Lo-level output. The output terminal of the voltage detector 132 is connected to a display driver 133.

The display driver 133 receives a signal including information necessary for a display operation. When the signal from the voltage detector 132 is at Lo level, the driver 133 drives its display element to allow a display state. When the signal from the voltage detector 132 is at Hi level, the driver 133 disables the display element.

The operation of the above-mentioned arrangement will now be described.

Assume that the film cartridge is already loaded, and hence, the switch 15 is turned on and the switch 30 is turned off. If the half-depression switch 100 is in an off state at this time, no circuit blocks are operated, and the output from the OR gate 111 is at Lo level. After a time has sufficiently passed from this state, since the NPN transistor 129 is in an off state, the capacitor 131 is charged. Then, the output from the voltage detector 132 goes to Hi level. Therefore, the display driver 133 disables the display element.

When the half-depression switch 100 is turned on by the first stroke of the release button, the output from the NOR gate 104 goes to Hi level since the output from the NAND gate 32 is at Lo level. The output from the NOR gate 104 is supplied to the NPN transistor 129 through the OR gates 111 and 128, thereby turning on the NPN transistor 129. Since the input to the voltage detector 132 is kept at Lo level while the NPN transistor 29 is kept on, the output from the voltage detector 132 is kept at Lo level. Thus, the display driver 133 sets the display element in the display state.

When the output from the NOR gate 104 goes to Hi level, the lens control circuit 106 and the photometer 107 are started.

The lens control circuit 106 starts displacement of the lens. If the release switch 109 is turned on before the lens is stopped at the in-focus position, the output from the NOR gate 105 goes to Hi level when the lens is stopped at the in-focus position and the output appearing at the terminal 106b of the lens control circuit 106 goes to Lo level.

When the release switch 109 is turned on after the lens is stopped at the in-focus position, the output from the NOR gate 105 goes to Hi level when the release switch 109 is turned on.

In any case, when the lens control circuit 106 detects the in-focus position, and stops the lens at that position to complete the operation, and when the release switch 109 is turned on, the output from the NOR gate 105 goes to Hi level. Then, the shutter control circuit 108 performs the opening/closing operation of the shutter, and holds the Hi-level output during the operation. During this interval, since the output from the OR gate 111 is kept at Hi level, the display driver 133 holds the display element in the display state.

When the release button is returned to a half-depressed state after the operation of the shutter control circuit 8 is completed, the switch 100 is turned on, and the lens control circuit 106 starts the returning operation of the lens to the predetermined reset position.

After the lens is returned to the reset position, the lens control circuit 106 terminates its operation. Subsequently, the film winding-up operation is performed, as described above.

While the output from the AND gate 26 is kept at Hi level, the output from the OR gate 111 goes to Hi level through the OR gate 122, and the display driver 133 holds the display element in the display state.

When the winding-up operation for one frame is completed and the output from the AND gate 26 goes to Lo level, the outputs from the OR gates 122, 111, and 128 go to Lo level, respectively, and the NPN transistor 129 is thus turned off. At the same time, the capacitor 131 starts charging. When the potential on the capacitor 131 exceeds the threshold value of the voltage detector 132, the output from the voltage detector 132 goes to Hi level, and the display driver 133 turns off the display element. A time duration from the completion of the winding-up operation until the display is turned off can be desirably determined in accordance with the threshold setting of the resistor 130, the capacitor 131, and the voltage detector 132. In this case, this time duration corresponds to 20 seconds.

A series of operations from the normal imaging operation to the winding-up operation have been described.

A case will be described below wherein the film end is reached.

When the film end is detected during the winding-up operation after the last frame is imaged, the AND gate 28 produces a Lo output. Subsequently, the film rewinding operation is performed, as described above. When the output from the AND gate 26 goes to Lo level, the output from the AND gate 37 goes to Hi level. Therefore, the output from the OR gate 122 is kept at Hi level, and hence, the display driver 133 holds the display element in the display state.

When the output from the NAND gate 32 goes to Hi level at this time, the NOR gates 104 and 105 hold their outputs at Lo level irrespective of other input signals. Therefore, while the NAND gate 32 is kept at Hi level, the lens control circuit 106, the photometer 107, and the shutter control circuit 108 cannot be operated even if the switch 100 and the release switch 109 are turned on (i.e., the release lock state is set).

When the film rewinding operation is completed, the switch 15 is turned off. This signal is input to the AND gate 37 through the inverter 36. Then, the output from the AND gate 37 goes to Lo level. Since the two inputs of the OR gate 122 are at Lo level, the output from the OR gate 122 goes to Lo level, and this output is supplied to the NPN transistor 129 through the OR gates 111 and 128, thereby turning off the transistor 129. At the same time, the capacitor 131 starts charging. In this state, since the output from the NAND gate 32 is kept at Hi level, the release lock state is held.

When 20 seconds have passed from the completion of the rewinding operation and the potential on the capacitor 131 exceeds the threshold value of the voltage detector 132, the output from the voltage detector 132 goes to Hi level, and the display driver 133 turns off the display element.

If the switch 100 is turned on in this state, the release lock state is held and the pulse generator 103 generates a one-shot Hi-level pulse. The pulse instantaneously turns on the NPN transistor 129 through the OR gate 128.

When the NPN transistor 129 is turned on, the capacitor 131 is discharged and then, is again charged. Upon discharging of the capacitor 131, the output from the voltage detector 132 goes to Lo level, and the display driver 133 sets the display element in the display state. This state can be held until 20 seconds have passed from when the display started and the potential on the capacitor 131 exceeds the threshold value of the voltage detector 132.

It display information includes one for signaling the completion of the rewinding operation to a user, a user will unload a film during this display. If the film is kept unloaded 20 seconds have passed from the completion of the rewinding operation and if the display element is turned off, only the display element is set in the display state while holding the release lock state, when the half-depression switch 1 is turned on, thereby signaling to a user that the film has been rewound.

When the back lid is opened in order to unload the film cartridge, the switch 30 is turned on. Thus, R-S latch circuits 32 and 33 are reset, and the output from the NAND gate 32 goes to Lo level. The release lock state is then canceled, and signals from the switch 100 and the release switch 109 are allowed to be input to the NOR gates 104 and 105.

The release inhibition operation by means of the release inhibiting means can be started at least when the film rewinding operation is completed, and can be ended when the back lid is opened to unload the film or when it is closed thereafter.

In consideration of one or a plurality of active circuits other than the display driver 133 as a circuit of a camera, which consumes a current, the action inhibiting means can be arranged such that the one or the plurality of active circuits can be disabled immediately after the completion of the rewinding operation without providing a predetermined period of time.

Figure 6:
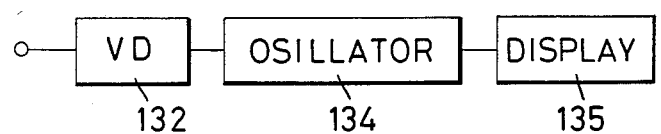
FIG. 6 is a block diagram showing an improvement of the third embodiment.

As shown in FIG. 6, an oscillator 134 for generating clock pulses during its operation and driving a display device 135 is arranged between the display device 135 and the voltage detector 132. When the output from the voltage detector 132 is set at Lo level, the oscillator 134 is enabled, and when the output goes to Hi level, the oscillator 134 is disabled, thereby turning off the display element.

More specifically, a means for producing a time clock are required in the lens control circuit 106, the photometer 107, and the shutter control circuit 108 (e.g., a pulse time produced by the pulse generator 103). A clock generated from the oscillator can be used as a reference clock for producing such a time clock. At this time, the oscillator is disabled in response to the output signal from the voltage detector 132 so as to turn off the display element, and the respective blocks of a control circuit receiving the above-mentioned clock are disabled. Thus, the release inhibiting means can disable the control circuit itself while holding the release lock state. The control circuit itself is also one of circuits which consume a current.

Figure 7:
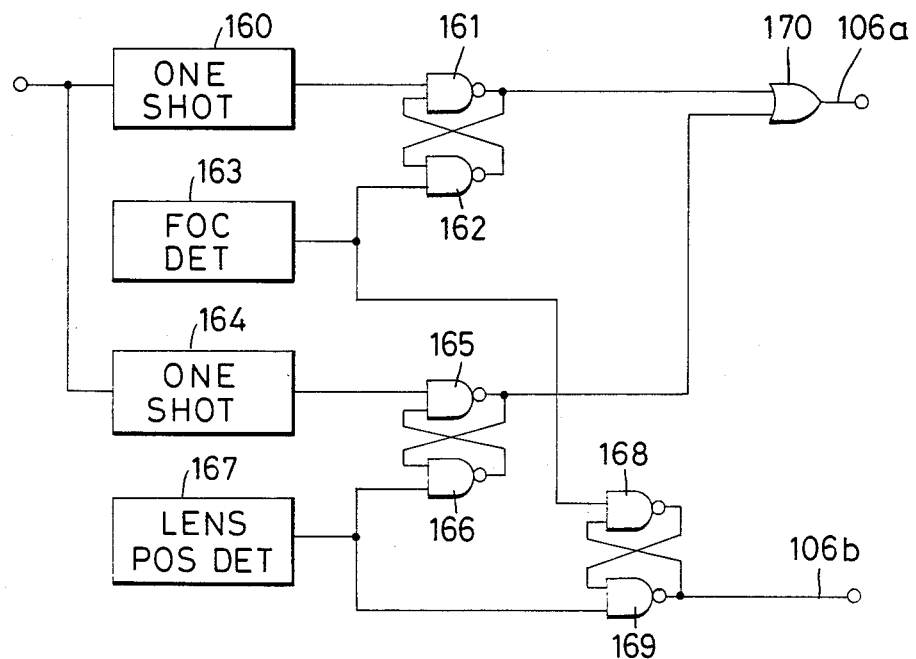
FIG. 7 is a detailed block diagram of part of the third embodiment of the present invention.

FIG. 7 is a block diagram showing part of the lens control circuit 106. One shot multivibrators 160 and 164 receive a signal from the NOR gate 104. A focus detector 163 detects a distance to an object. When the lens 101 reaches the in-focus position, the detector 163 produces Hi-level pulses during a predetermined period of time. A lens position detector 167 detects that the lens 101 is returned to the reset position, and generates Hi-level pulses for a predetermined period of time. The one shot multivibrator 160 generates Lo-level pulses during a predetermined period of time in response to the Hi-level output from the NOR gate 104. The one shot multivibrator 164 produces Lo-level pulses for a predetermined period of time in response to the Lo-level output from the NOR gate 104. NAND gates 161 and 162 constitute a flip-flop. The output from the NAND gate 161 goes to Hi level in response to the pulses from the one shot multivibrator 160, and goes to Lo level in response to the pulses from the focus detector 163. NAND gates 165 and 166 constitute a flip-flop. The output from the NAND gate 165 goes to Hi level in response to the pulses from the lens position detector 167 and goes to Lo level in response to the pulses from the one shot multivibrator 166. NAND gates 168 and 169 constitute a flip-flop. The output from the NAND gate 169 goes to Lo level in response to the pulses from the focus detector 163 and goes to Hi level in response to the pulses from the lens position detector 167.

What is claimed is:

1. A camera capable of automatically rewinding a film into a cartridge, comprising:
    (a) detection means for detecting completion of a film rewinding operation and producing a detection signal;
    (b) warning means, responsive to the detection signal, for warning; and
    (c) control means for controlling said warning means, said control means having timer means for measuring a predetermined period of time.

2. A camera according to claim 1, wherein said timer means generates an end signal in response to completion of the measuring operation of the predetermined period of time, and said control means stops the operation of said warning means in response to the end signal.

3. A camera according to claim 2, further comprising a back lid which is opened and closed in order to load a film cartridge, and wherein said control means stops the operation of said warning means in response to the opening/closing operation of said back lid irrespective of the end signal.

4. A camera capable of automatically rewinding a film into a cartridge, comprising:
    (a) means for detecting that no film is present at a predetermined position in said camera, and producing a detection signal;
    (b) display means for displaying imaging information; and
    (c) control means for causing said display means to flicker-display the imaging information in response to the detection signal.

5. A camera according to claim 4, wherein said display means has a plurality of display units, and said control means flicker-displays part of said plurality of display units in response to said detection signal.

6. A camera according to claim 4, wherein said control means has means for starting measuring of a predetermined period of time in response to the detection signal and producing an end signal in response to the completion of the measuring operation of the predetermined period of time, and said control means causes said display means to stop display of the imaging information in response to the end signal.

* * * * *